United States Patent [19]

Höfgen et al.

[11] 4,418,349

[45] Nov. 29, 1983

[54] AIRPORT SURVEILLANCE SYSTEM

[75] Inventors: Günter Höfgen, Kornwestheim; Heinz L. Cohrs, Remseck, both of Fed. Rep. of Germany

[73] Assignee: International Standard Electric Corporation, New York, N.Y.

[21] Appl. No.: 248,877

[22] Filed: Mar. 30, 1981

[30] Foreign Application Priority Data

Apr. 1, 1980 [DE] Fed. Rep. of Germany ....... 3012616

[51] Int. Cl.³ .................. G01S 13/80; G01S 13/91
[52] U.S. Cl. .......................... 343/6.5 R; 343/454
[58] Field of Search .......... 343/6.5 R, 6.5 LC, 18 C, 343/112 R, 112 TC, 5 LS, 6.8 R; 340/24, 25, 26

[56] References Cited

U.S. PATENT DOCUMENTS

| | | | |
|---|---|---|---|
| 3,805,264 | 4/1974 | Bock et al. | 343/6.5 R |
| 3,875,570 | 4/1975 | Litchford | 343/6.5 LC |
| 4,027,307 | 5/1977 | Litchford | 343/6.5 LC |
| 4,075,631 | 2/1978 | Dumez | 343/6.5 R |
| 4,115,771 | 9/1978 | Litchford | 343/6.5 R X |
| 4,137,531 | 1/1979 | Pell | 343/6.5 R |
| 4,179,695 | 12/1979 | Levine et al. | 343/6.5 R |
| 4,197,536 | 4/1980 | Levine | 343/6.5 R |
| 4,319,243 | 3/1982 | Vachenauer et al. | 343/6.5 R |

FOREIGN PATENT DOCUMENTS 2073530 10/1981 United Kingdom ........... 343/6.8 R

OTHER PUBLICATIONS

Aviation Week & Space Technology, Jun. 28, 1976, pp. 67, 70-73, AGARD Conf. Proc. No. 188 21-12.

*Primary Examiner*—Maynard R. Wilbur
*Assistant Examiner*—Robert C. Burk
*Attorney, Agent, or Firm*—T. E. Kristofferson; W. T. O'Neil

[57] ABSTRACT

Located adjacent to runways, taxiways, and approach ramps are secondary radar interrogators which radiate the P1 and P3 pulses and the P2 pulse via different directional patterns into sectors to be monitored which are individually assigned to each interrogator. Direction finders at different locations determine the directions of arrival of SSR reply signals radiated by an airborne SSR transponder in a sector to be monitored. From the directions of arrival and the locations of the direction finders, the respective transponder position is determined. The interrogators require no central control. Alternatively, the arrival times of the SSR reply signals are measured at several points; an evaluating device forms the differences in arrival time, and the intersection of the hyperbolic lines of position determined in the evaluating device is the position of the transponder.

10 Claims, 3 Drawing Figures

AIRPORT SURVEILLANCE SYSTEM

BACKGROUND OF THE INVENTION

The present invention relates to an airport surveillance system. An airport surveillance system of this kind is proposed in German Patent Specification DE-OS P 29 34 844 and the corresponding U.S. Pat. No. 4,179,695.

In the airport surveillance system described there, SSR interrogation signals (SSR=secondary surveillance radar, secondary radar) are transmitted to SSR transponders on vehicles, such as aircraft moving on the surface of the airport, which respond with an SSR reply signal if the vehicle is within the range of the interrogation signals. For vehicle identification, the SSR reply signal contains a code assigned to the respective vehicle. A display device shows where each aircraft or vehicle is located. This aircraft surveillance system involves a great amount of technical complexity. Two interrogators located opposite each other on both sides of the runway are provided for generating the SSR interrogation pulses. Since the interrogators are controlled from a center by being addressed, expensive cabling is required on the airport. All interrogators are provided with receivers.

OBJECT

The object of the invention is to provide an airport surveillance system in which inexpensive interrogators can be used.

SOLUTION

This object is attained by the means described hereinafter.

ADVANTAGES

The interrogators of the invention contain no receivers, are simple in construction, and can be battery-powered. For the reception of the SSR reply signals, a few direction finders or receivers with time measuring devices are sufficient. If this airport surveillance system is installed on an existing airport, the fact that battery-operated interrogators can be used is particularly advantageous, because cabling of the interrogators would be particularly costly in that case.

DESCRIPTION OF THE PREFERRED EMBODIMENT

A preferred embodiment of the invention will now be explained in more detail with reference to the accompanying drawings, in which.

Figure 1:
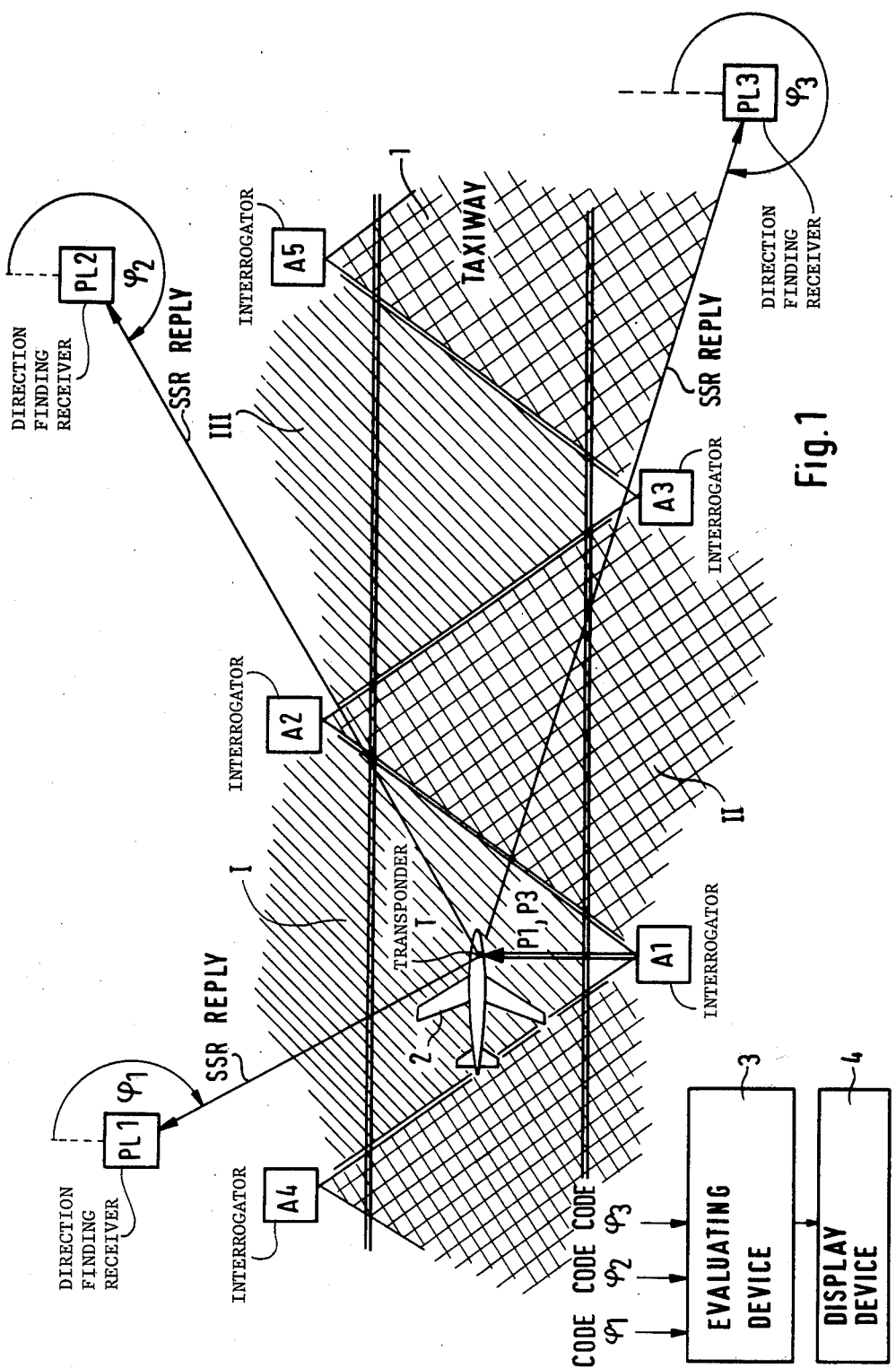
FIG. 1 shows the arrangement of the interrogators and the direction finders.

In the system of the invention the vehicles or aircraft to be detected in the area to be monitored by the aircraft surveillance system are equipped with SSR transponders. The fundamental principles of secondary radar, including the signals and SSR equipment used (interrogators and SSR transponders), are described in a book by P. Honold entitled "Sekundär-Radar", Verlag Siemens AG, 1971. In the following description, reference will be made to individual chapters or pages of that book.

For the description, the area to be monitored is assumed to be a portion of a runway or taxiway 1 generically referred to hereinafter as a pathway, on which an aircraft 2 equipped with an SSR transponder T is taxiing (see FIG. 1). SSR transponders are described in Chapter 3 of the above-cited book entitled "Sekundär-Radar".

Arranged alternately on both sides of the taxiway 1 are several interrogators A1 to A5. These interrogators transmit the P1, P2, and P3 pulses so that an SSR transponder T, being in a given position of the area to be monitored, receives the spaced P1 and P3 pulses and a P2 pattern control pulse in such a manner only from an interrogator assigned to this position that it recognizes them as SSR interrogation pulses.

Thus, the area to be monitored is divided into several sectors I, II, and III. In the embodiment shown, the sectors are approximately triangular and adjacent to each other. How the spatial shape of a sector is produced will be explained with the aid of FIG. 3. The sectors may also slightly overlap.

The division of the area to be monitored into individual sectors prevents an SSR interrogation signal from being replied to by all SSR transponders in the entire area to be monitored. In the below-described method of determinining the position of the SSR transponder transmitting the SSR reply signal, this would result in extraordinary difficulties or even render evaluation impossible, because the approximately 25 $\mu$s long reply signals (typically) would overlap (garbling).

The instants at which the SSR interrogation pulses are transmitted by the interrogators are not controlled centrally, but the interrogators operate independently with statistically distributed transmissions. To accomplish this, each interrogator is equipped with a random timing clock generator which determines the instants of transmission of the SSR interrogation pulses. Since all clock generators are operated independently of each other, the instants of transmission of the individual interrogators have no synchroneous relationship to each other but form a random sequence.

The time between two successive interrogation-signal transmissions is typically 10 to 100 ms.

With this control of the instants of transmission it may happen in isolated cases that two interrogators assigned to different sectors transmit an SSR interrogation signal at the same time, and that two SSR transponders then respond at the time. Because of the very low occupancy, however, the probability that this will happen is very small. This means that inherent spurious modulation is negligible, because the respective next SSR interrogation signals are again transmitted at different times, and because the interrogatuons follow each other so quickly that the usefulness of individual measurements is not disturbed.

The SSR transponder T on board a taxiing aircraft 2 radiates the SSR reply signals omnidirectionally. These are received by three direction finders PL1, PL2, and PL3, which are located on the airport and measure the directions of arrival $\phi_1$, $\phi_2$, and $\phi_3$, respectively. These measured angles of arrival, together with the aircraft address of the SSR reply signal, are transmitted to an evaluating device 3. There the instantaneous position of the SSR transponder having transmitted the SSR reply signal is determined in the well-known manner (triangulation) from the measured directions of arrival and the known positions of the direction finders.

The position of the SSR transponder is shown on a display device 4 in the known manner (e.g. by illuminated symbols on a display on which the taxiways, runways, and other areas to be monitored are presented graphically). It is also possible to additionally display the code assigned to the SSR transponder in question.

Suitable direction finders are, inter alia, monopulse direction finders which operate on the interferometer principle ("Funksysteme für Ortung und Navigation", edited by E. Kramar, Verlag Berliner Union GmbH, Stuttgart 1973, pp. 79-82; paper "Schnellpeilung nach dem DLS-Prinzip als möglicher Beitrag zum Ausbau eines Sekundärradars", read by G. Höfgen at the "Symposium über Radartechnik", Nov. 13, through 15, 1974, Munich). The measured angles and the codes can be transmitted, for example, as in the Air-Traffic-Control Radar Beacon System (M. J. Skolnik, "Radar Handbook", McGraw Hill Book Co., New York, 1970, Chapter 38, especially page 38-2).

The typical antenna of an interrogator will now be explained with the aid of FIG. 2.

SSR interrogators per se are described in the above-cited book "Sekundär-Radar" in Chapter 2. Of particular interest are Chapters 2. to 2.4.3. Compared with the SSR interrogators described there, the interrogators required here are much simpler in construction. For instance, there are no receiving devices, and the transmitting powers need only be in the milliwatt range.

The interrogators for the surveillance system must perform the following tasks:

They must transmit the P1 and P3 interrogation pulses;

they must transmit the P2 SLS (side lobe suppression) pulse;

the interrogations, consisting of the P1, P2, and P3 pulses, are controlled by a less stable clock generator. Thus, the instants of transmission by the individual interrogators are not determined by a fixed timetable, but their time relationship to each othe is random;

the radiated pulses have only little power (few mW). Their range is thus only about 100 m; and sectors to be monitored must be formed by the type of pulse radiation chosen.

In the example shown in Chapter 2.4.3 of the book cited above, the P1 and P3 pulses are applied to a directional antenna, and the P2 pulse is applied to an omnidirectional antenna.

Figure 2:
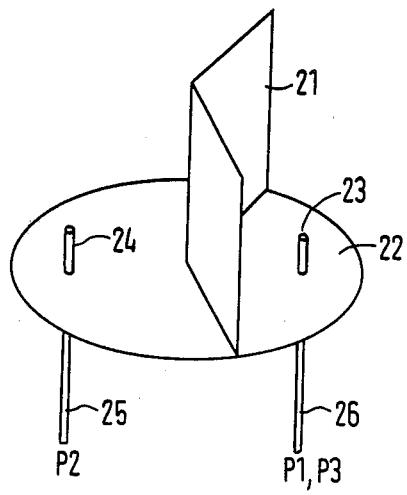
FIG. 2 shows the antenna of an interrogator.

The antenna of the novel interrogator comprises a counterpoise 22 supporting an angle reflector 21 (FIG. 2). On both sides of the angle reflector 21, monopoles 23, and 24 are disposed on the counterpoise 22. The monopole 24, projecting through the counterpoise 22 surface which is adjacent to that side of the angle reflector 21 forming the greater angle, is supplied with the P2 pulse, while the other monopole, 23, is provided with the P1 and P3 pulses.

The word concave used hereinafter respecting reflector 21 includes the corner reflector shape illustrated in FIG. 2.

Figure 3:
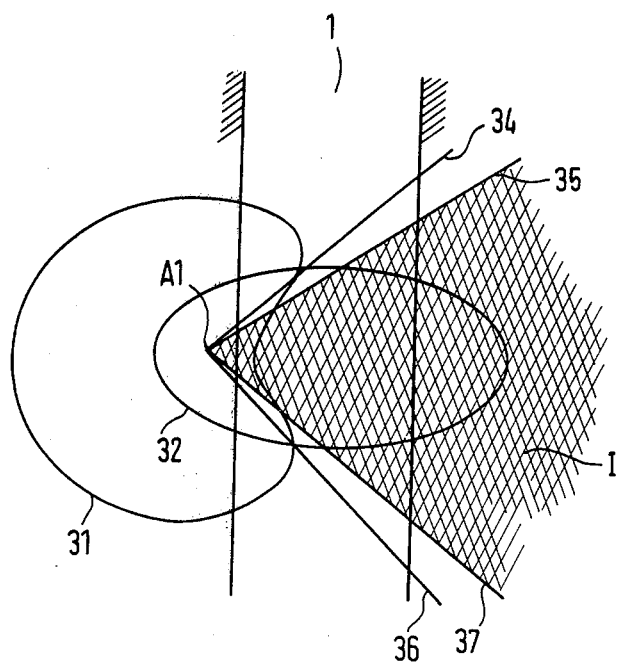
FIG. 3 shows the directional patterns of an interrogator.

In FIG. 3, like in FIG. 1, the interrogator A1 is located beside the taxiway 1. As stated earlier, the pulses P1, P3 and the pulse P2 are radiated via different directional patterns.

The amplitude of a P1 pulse received by the secondary radar transponder must exceed the amplitude of a received P2 pulse by at least 9 dB if an SSR reply signal is to be radiated in response to a received P1, P3 interrogation pulse pair (cited book "Sekundär-Radar", Chapter 1.6.1). Therefore, the directional patterns and the pulse amplitudes are chosen so that this condition is satisfied in only one sector. In this manner, each interrogator is assigned one sector.

The pulse P1 and P3 are radiated via the directional pattern 32, and the pulse P2 is radiated via the directional pattern 31.

If a transponder is located in the direction of the straight line 34 or 36, it receives the P1 pulse with an amplitude equal to that of the P2 pulse. Consequently, it will not reply to these interrogations from the interrogator A1. Only between the straight lines 35 and 37 will received P1 pulses have an amplitude exceeding that of the P2 pulses by at least 9 dB, i.e., only in this area will interrogations from the A1 interrogator be recognized as secondary radar interrogation signals. This area is the sector I. The right-hand limit of the sector I of FIG. 3 depends on the directional pattern 32 and the radiated pulse amplitude.

By the other interrogators, further sectors are formed analogously, which, as mentioned above, are contiguous or slightly overlap one another.

Particularly advantageously, additional transmitters radiate additional P2 pulses or P1, P2 pulse pairs in such a manner than they have such a large amplitude at the side of the taxiway that P1, P3 pulse pairs are no longer processed there are secondary radar interrogation pulses. In this manner, a sector to be monitored is limited to a section of the taxiway to a good approximation.

In a further embodiment, the direction finders PL1, PL2 and PL3 are replaced by SSR receivers followed by a time-measuring device. In this case, the time-measuring devices must be in synchronism. The arrival times of an SSR reply signal are then transmitted together with the aircraft address of the SSR reply signal to the evaluating device 3. There at least two differences in arrival time are calculated. Since the positions of the SSR receivers having received the SSR reply signal are also known in the evaluating device, two hyperbolic lines of position are obtained there from the calculated time differences. The intersection of these hyperbolic lines of position is the instantaneous position of the SSR transponder which radiated the corresponding SSR reply signal. A display is then provided like in the embodiment explained with the aid of FIG. 1.

The SSR receivers, time-measuring devices, and their synchronization as well as the hyperbolic direction-finding system are generally known and, therefore, will not be explained here in detail.

What is claimed is:

1. A radar system for airport surface surveillance for identifying the positions on said surface of vehicles including aircraft equipped with SSR transponders responsive to a predetermined P1 and P3 interrogation pulse format providing predetermined P1 to P2 time spacing, and to a P2 pulsed pattern comprising:

first means including a plurality of self-timed, mutually asynchronous pulsing interrogators providing generally lobe-shaped horizontal radiation patterns, said interrogators distributed along the sides of a pathway in a substantially symmetrical alternating pattern whereby each interrogator is located on a side of said pathway opposite that of the preceding and the next succeeding interrogator along the length of said pathway;

second means within each of said interrogators for radiating signals corresponding to said P1 and P3 pulses in a generally lobe-shaped pattern within a corresponding sector across said pathway, and signals corresponding to said P2 pulses in a pattern having lower amplitude within said sector than the amplitude of said lobe-shaped pattern but higher amplitude than said lobe-shaped pattern outside said sector;

third means comprising at least two auxiliary equipments spaced from said pathway for receiving the SSR transponder reply signals emitted by said SSR transponders, said auxiliary equipments each being adapted to determine at least one of the discrete parameters consisting of angle of arrival of said SSR reply signals and time of arrival of said SSR reply signals; and fourth means responsive to at least one of said discrete parameters determined by said third means for identifying the instantaneous position of said SSR transponder along said airport surface.

2. A system according to claim 1 in which said fourth means responds to said discrete parameter from each of said auxiliary equipments corresponding to angles of arrival of said SSR transponder reply signals, for determining the location of said SSR transponder on the basis of intersection of said angles of arrival.

3. A system according to claim 1 in which said fourth means responds to said discrete parameter from each of said auxiliary equipments corresponding to time of arrival of said SSR reply signals, said auxiliary equipments having substantially omni-direction receiving characteristics.

4. A system according to claim 1 in which said auxiliary equipments are defined as direction finders.

5. A system according to claim 1 in which said auxiliary equipments are at least three in number.

6. A system according to claim 2 in which said auxiliary equipments are at least three in number.

7. A system according to claim 3 in which said auxiliary equipments are at least three in number.

8. A system according to claim 4 in which said auxiliary equipments are at least three in number.

9. A system according to claim 1 in which said second means comprises an antenna having first and second spaced radiating elements extending from a conductive counterpoise plane and a reflecting surface generally normal to said counterpoise plane and generally concave toward said first radiating element and said pathway, said first radiating element being energized by signals corresponding to said P1 and P3 pulses and said second radiating element being energized by signals corresponding to said P2 pulse.

10. A system according to claim 1 further including a display device responsive to said fourth means for displaying said SSR transponder instantaneous position along said airport surface.

* * * * *